Dec. 30, 1958   F. D. KORKOSZ ET AL   2,866,704
STAR PLATE AND METHOD OF MAKING SAME
Filed Dec. 8, 1954
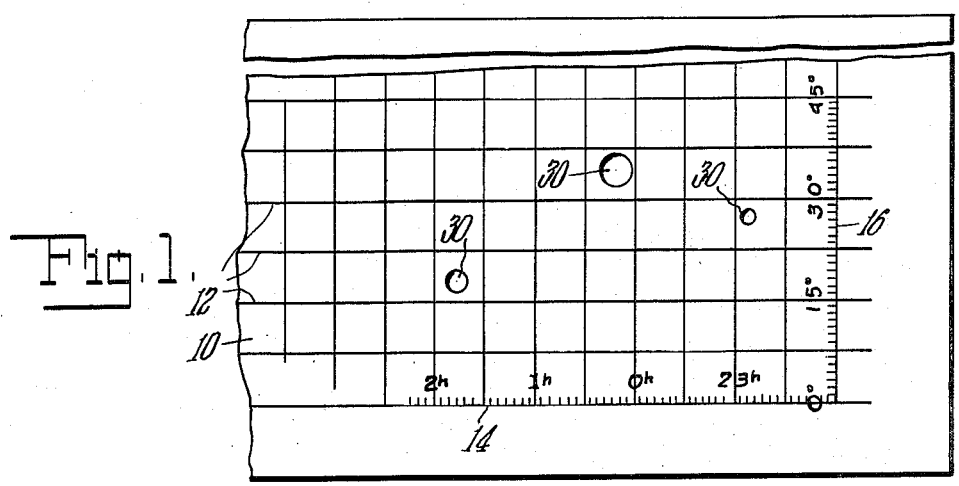
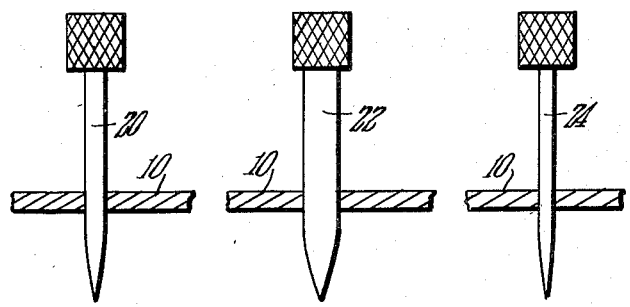
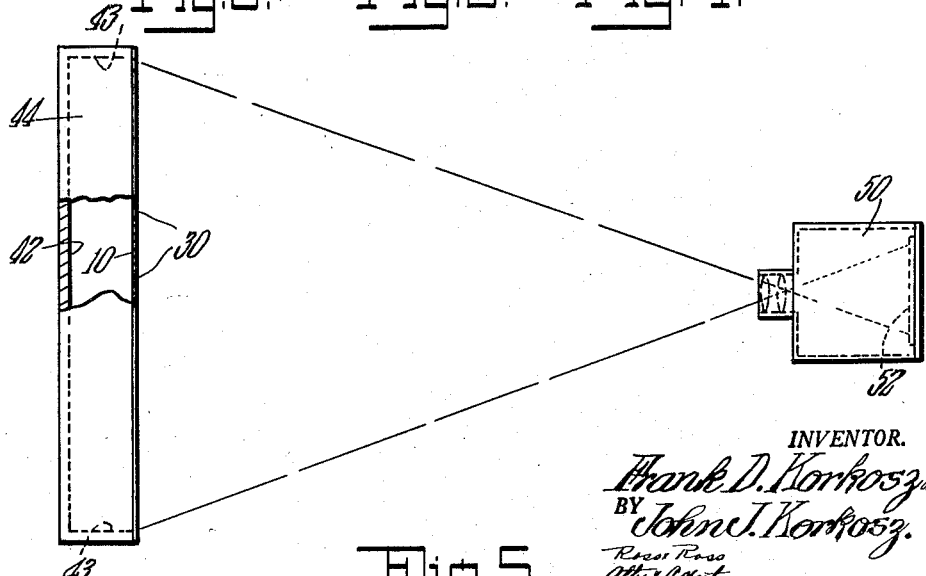
INVENTOR.
Frank D. Korkosz and
BY John J. Korkosz.
Reed Ross
Atty & Agent.

United States Patent Office 2,866,704
Patented Dec. 30, 1958

2,866,704

STAR PLATE AND METHOD OF MAKING SAME

Frank D. Korkosz and John J. Korkosz, Chicopee, Mass.

Application December 8, 1954, Serial No. 473,942

1 Claim. (Cl. 96—27)

Our invention relates to new and useful improvements in a mask or diapositive or star plate as used in planetaria and to a method of making same.

The invention is directed more particularly to the provision of an improved device by which the stars in the heavens may be more faithfully and accurately simulated by means of a planetarium or similar projecting apparatus whereby spots of light are projected upon an interior dome-shaped surface of a sphere so as to present to an observer within the sphere the appearance of the heavens from any particular place on the earth.

It is the principal object of our invention to provide a novel and improved device, and a means of making the same, whereby spots of light of predetermined dimensions may be projected upon a dome or surface representing a sky, all to the end that a multiplicity of stars of correctly differing brilliancies or magnitudes which are more correctly and accurately positioned relative to each other is provided.

That is to say, the principal objects and advantages of the present invention are directed to the provision of a novel means whereby light spots of different brilliancies representing stars and heavenly bodies of different intensities or magnitudes may be projected onto a surface such as a dome simulating the sky.

One of the primary purposes of the invention is to provide structural and operational improvements in devices of the class to which reference has been made, which improvements simplify the method of making same and provide masks or star plates which permit the improved simulation of stars, both as to their relative intensities or magnitudes and as to their correct positions in the heavens.

With the above primary objects in view, it is still another object of the invention to provide a method and means of the above described character whereby the objections and difficulties inherent in prior art devices insofar as unfaithful and inaccurate representations of stars in the heavens are concerned are obviated.

Other prime objects of the invention include: first, the attainment of a higher degree of accuracy and a greater degree of variety in the manner of work to be performed with the product of the invention than has heretofore been possible with prior methods and/or devices known in the art; second, the attainment of a higher speed in the making of the star plate due to the simplification in the steps of the method of making same; third, the provision of an improved star plate which may be made more economically than prior art devices having a similar function and purpose; and fourth, the provision of such other improvements in and relating to star plates of the type above referred to as are hereinafter described and claimed.

All of the above objects we accomplish by means of such structure and relative arrangements of parts thereof, as will fully appear by a perusal of the description below and by various specific features which will be hereinafter set forth.

To these above cited and other ends and with the foregoing and various other novel features and advantages and other objects of the invention as will become more readily apparent as the description proceeds, our invention consists in certain novel features of construction and in the combination and arrangement of parts as will be hereinafter more particularly pointed out in the claims hereunto annexed and more fully described and referred to in connection with the accompanying drawings wherein:

Fig. 1 is a partial top plan view of the sheet member of our invention;

Figs. 2, 3 and 4 are partial sectional elevational views of the sheet member shown in association with needle members of the invention; and Fig. 5 is an elevational view of a shadow box and camera as employed in the method of our invention.

In the accompanying drawing, we have illustrated a complete example of a physical embodiment of the invention in which the parts are combined and arranged in accordance with one mode which we have devised for the practical application of the principles of the invention.

It will, however, be understood that changes and alterations are contemplated and may be made in these exemplifying drawings and mechanical structures, within the scope of the claim, without departing from the principles of the invention.

In the following description and claim, various details will be identified by specific names for convenience. These names, however, are intended to be as generic in their application as the art will permit.

In order that the general relation and utility of the components in the herein described method may be better understood, the method of making the star plate of the invention will be explained in a step-by-step manner.

An enlarged spherical surface or screen, representative of the actual sphere, if not the actual sphere itself, within which the planetarium is to be operated is first employed. The sphere is representative of the heavens or sky in which stars appear.

Upon the inner surface thereof, the celestial coordinates are accurately drawn or painted, as for example black lines upon a white surface, in such a manner that the surface or at least a portion thereof can be photographed whereby the grid lines representing the celestial cordinates will appear on the negative.

The inner surface of the spherical body is photographed by means of a camera which is located at an eccentric position relative to the true center of the sphere, which eccentric position is representative of the true angular position of a star plate adjacent a lens in the projection system of a planetarium in relation to the spherical dome such as is shown in Patent No. 2,661,654 issued to Frank D. Korkosz on December 8, 1953.

That is to say, it is to be appreciated that in the actual projection apparatus, the hollow spherical dome-like object or plurality thereof within which a light source or sources is or are located, carry properly located lens systems and masks or star plates cooperating therewith. These lens systems serve to pass light rays therethrough whereby light spots simulating stars are projected upon the spherical dome or surface representative of the sky. These lens systems are normally offset relative to or are spaced from the true center of the projection apparatus by distances of several inches or possibly feet so that when the projection apparatus is installed within the semisphere or domed surface representative of the sky the different lens systems are positioned relative thereto at different angles. These differences in angles must be compensated for in order that the rays of light projected with the said lens systems will simulate stars of the correct intensities which stars are correctly positioned relative to each other on the surface representing the sky.

To repeat, the important detail to take cognizance of is that the lens systems are spaced from the true center of rotation of the projecting structure presenting the objection that they are positioned eccentrically relative thereto and hence would project distorted representations of stars unless such eccentricity were compensated for.

The compensation for such distortion is one of the important purposes of this invention.

As aforesaid, the celestial coordinates are first accurately drawn on an enlarged spherical surface or screen and are then photographed by the camera, whereupon a flat negative is obtained which pictures the celestial coordinates in their distorted relative positions due to the angle from which the picture was taken. That is, the picture on the flat negative reproduces the coordinates on the curved surface as photographed.

By means of the negative so obtained, a picture thereof may be projected upon an enlarged flat white sheeting or working surface 10 comprised of paper or similar material.

If desired, the celestial coordinates can be transferred to this sheeting as by printing or drawing the same thereon although same is not necessary.

It is to be appreciated that the lens elements originally used to photograph the celestial coordinates drawn upon the curved spherical surface are subsequently used to reproject the images of distorted coordinates on the flat sheeting or working surface. By using the same lens elements, a more accurate plotting is obtained, all variations in focal lengths, variations or differences between lens of different manufacture and the like being eliminated.

The sheet of paper 10 upon which the celestial coordinates 12 are printed or drawn may be provided with scales 14 and 16 if desired, it being appreciated that the scales are a greatly enlarged scale as compared with the reduced celestial charts of the conventional form such as are used in books and the like.

That is to say, the usual chart employing celestial coordinates and by means of which the relative positions and magnitudes of the stars may be graphically portrayed is usually of a small, so-called book size, whereas it is to be appreciated that the sheeting 10 shown in Fig. 1 may be several feet both in height and in width.

By so magnifying or enlarging the chart, the stars may obviously be plotted more accurately relative to the celestial coordinates.

When the precise locations of the various stars and other celestial bodies are determined, the sheet 10 is then perforated by means of needles 20, 22 and 24, same representing needles of various diameters which are employed to make the perforations of varying diameters. By way of illustration as shown in Fig. 2, needle 20 may be 0.0009" in diameter, needle 22 in Fig. 3 may be 0.015" in diameter, and needle 24 in Fig. 4 may be 0.0005" in diameter.

Openings or holes 30 are perforated in the sheet 10 by means of the aforementioned needles. Said openings being of known measured diameters are thereby more accurately represented upon the sheet 10 than would be possible were spots drawn or painted upon the sheet.

The sheet member 10, with the appropriately spaced openings 30 therethrough is then placed over a shadow box having a rear wall 42, top and bottom walls 43, and end walls 44. The shadow box is provided with a dull black interior surface so that when the perforated sheet 10 is disposed thereover and the outer side of the sheet is illuminated by a lamp (not shown) which is spaced therefrom and directed thereonto, the openings 30 appear as black spots against the white surface.

A camera 50 is so arranged relative to the sheet 10 as to be adapted to photograph the surface thereof. In this way, a picture of a totally white area having black spots of varying sizes or diameters in the predetermined locations is attained.

A negative 52 is thus obtained which comprises a black background and a myriad number of white spots representing the stars desired to be projected, which spots are reduced to the small but proportionate sizes for accurate projection when the negative is used as a star plate.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description.

What it is desired to claim and secure by Letters Patent of the United States is:

The method of making a star plate of the described character consisting of the steps, photographing from the concave side a sphere having celestial coordinates painted therein, projecting the celestial coordinates so photographed onto a flat light reflective sheeting, locating points on the sheeting representing on a reduced scale a portion of the celestial heavens as defined by certain of the celestial coordinates, perforating the sheeting with needles at the located points, placing the sheeting over a shadow box, and photographing the sheeting to produce a star plate having multiple clear spots in a dark area.

References Cited in the file of this patent

The Commercial Photographer, Rose, 1920, p. 78.
Photography in Engineering, Tupholme, pp. 148–150, Chemical Publishing Co., 1949, Brooklyn, New York.